United States Patent
Marmanis

(10) Patent No.: US 11,663,274 B2
(45) Date of Patent: May 30, 2023

(54) REFERENCE-BASED DOCUMENT RANKING SYSTEM

(71) Applicant: Copyright Clearance Center, Inc., Danvers, MA (US)

(72) Inventor: Haralambos Marmanis, Waltham, MA (US)

(73) Assignee: COPYRIGHT CLEARANCE CENTER, INC., Danvers, MA (US)

( * ) Notice: Subject to any disclaimer, the term of this patent is extended or adjusted under 35 U.S.C. 154(b) by 0 days.

(21) Appl. No.: 17/032,461

(22) Filed: Sep. 25, 2020

(65) Prior Publication Data

US 2021/0248191 A1 Aug. 12, 2021

Related U.S. Application Data

(60) Provisional application No. 62/972,825, filed on Feb. 11, 2020.

(51) Int. Cl.
*G06F 16/9038* (2019.01)
*G06F 16/93* (2019.01)
(Continued)

(52) U.S. Cl.
CPC .... *G06F 16/9038* (2019.01); *G06F 16/90335* (2019.01); *G06F 16/93* (2019.01); *G06F 17/16* (2013.01); *G06F 18/29* (2023.01)

(58) Field of Classification Search
CPC .......... G06F 16/24578; G06F 16/2457; G06F 16/93; G06F 16/90335; G06F 16/9038;
(Continued)

(56) References Cited

U.S. PATENT DOCUMENTS 6,285,999 B1 * 9/2001 Page ............... G06F 16/951
8,983,970 B1 * 3/2015 Osinga ............ G06K 9/00463
707/748

(Continued)

OTHER PUBLICATIONS

Ranking Scientific Articles by Exploiting Citations, Authors, Journals, and Time Information written by Yujing Wang, Yunhai Tong. (Year: 2013).*

*Primary Examiner* — Hau H Hoang
(74) *Attorney, Agent, or Firm* — Kriegsman & Kriegsman

(57) ABSTRACT

A system for ranking electronic documents based on reference frequency includes a central controller in electronic communication with a document database. The central controller maintains a graphical model of the electronic documents that identifies all references between documents. A weight is automatically calculated and assigned to each reference within the graphical model in order to increase the significance of document references which are based on subject matter relevance and decrease the significance of document references which are based on interpersonal relationships or other meritless factors. Using the weighted graphical model, the central controller is able to automatically identify document clusters having similar subject matter, create a probability matrix for each cluster based on the weighted graphical model, and apply a power iteration to each probability matrix to yield a reference-based ranking of the electronic documents within each cluster.

14 Claims, 5 Drawing Sheets

(51) Int. Cl.
*G06F 17/16* (2006.01)
*G06F 16/903* (2019.01)
*G06F 18/20* (2023.01)

(58) Field of Classification Search
CPC .......... G06F 16/24; G06F 16/94; G06F 17/16; G06N 3/04
See application file for complete search history.

(56) References Cited

U.S. PATENT DOCUMENTS

| | | | | |
|---|---|---|---|---|
| 2012/0047149 | A1* | 2/2012 | Zhou | G06F 40/205 |
| | | | | 707/748 |
| 2014/0280371 | A1* | 9/2014 | Bastide | G06F 16/35 |
| | | | | 707/803 |
| 2020/0250213 | A1* | 8/2020 | Duchin | G06F 16/319 |
| 2021/0319036 | A1* | 10/2021 | Williams | G06F 16/288 |

* cited by examiner

REFERENCE-BASED DOCUMENT RANKING SYSTEM

CROSS-REFERENCE TO RELATED APPLICATIONS

The present application claims the benefit under 35 U.S.C. 119(e) to U.S. Provisional Patent Application No. 62/972,825, which was filed on Feb. 11, 2020 in the name of Haralambos Marmanis, the disclosure of which is incorporated herein by reference.

FIELD OF THE INVENTION

The present invention relates generally to systems and methods for ranking documents and, more particularly, to reference-based document ranking systems.

BACKGROUND OF THE INVENTION

Document ranking systems utilize complex search algorithms to sort a collection of documents based on a variety of different factors including, but not limited to, term frequency, access history, and citation prevalence. Using these factors, search algorithms are more effectively able to rank documents in order of perceived significance to the searching party.

In order to more efficiently engage in search algorithms and ranking systems of the type described above, a collection of documents stored in a database is often modeled in view of its content. For instance, graph data modeling, or graph modeling, is commonly utilized to create a data model of documents stored in a common database. In this manner, graph modeling allows for the visualization of connections (i.e. relationships) between the various individual documents (i.e. nodes).

Citation frequency is often utilized as the basis for connecting information sources, thus creating a graph that models their interdependency. The rationale is that sources (e.g. scientific articles) that are most frequently cited by other sources should be considered authoritative and reliable in the field. Accordingly, algorithmic rules are implemented which account for citation frequency in document search rankings.

However, the applicant has recognized some notable shortcomings associated with ranking systems which rely principally upon citation frequency.

As a first shortcoming associated with traditional citation-based document searching, it has been found that an author is often prone to cite articles written by the author, close colleagues or other entities with whom the author has a preexisting relationship. As a result, an author may elect to cite an article for self-serving interests and/or personal courtesies rather than notable significance or relevance in the field, thereby compromising the overall quality of the citations as a measure of impact and consequently degrading search results that rely on citation-based ranking algorithms.

As a second shortcoming associated with traditional citation-based document searching, particularly as it pertains to scientific literature, it has been found that most citation-based measures capture journal-level and author-level impact rather than article-level impact. In other words, the publication of an article in a frequently-cited journal increases the cumulative citation-based rank of that article above the rank that the article would have received based solely on direct citations received. This characteristic promotes competition for publication in highly ranked journals but does not necessarily promote the best articles.

As a third shortcoming associated with traditional citation-based document searching, it has been found that citations often link a wide and heavily disparate group of documents. As a result, one or more heavily-cited documents falling outside of the subject matter of the document search can potentially obscure moderately-cited documents which are more subject matter pertinent, thereby diluting the overall quality of the search results.

SUMMARY OF THE INVENTION

In view thereof, it is an object of the present invention to provide a reference-based document ranking system that is designed to yield the most optimal collection of documents to the searching party.

More particularly, it is an object of the present invention to provide a reference-based document ranking system that compensates for, or deemphasizes, citations rendered based on preexisting relationships rather than content relevance and/or author recognizability.

Additionally, it is an object of the present invention to provide a reference-based document ranking system that accounts for subject matter, or content, variances between a vast collection of documents which are otherwise linked by references.

Accordingly, as one feature of the present invention, there is provided a method for ranking electronic documents, the method comprising the steps of (a) constructing a reference-based graphical model of the electronic documents that identifies all references between the electronic documents, (b) assigning a weight to each reference in the electronic documents to yield a weighted graphical model, (c) creating a probability matrix based on the weighted graphical model, and (d) applying a power iteration to the probability matrix to yield a reference-based ranking of the electronic documents.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings, wherein like reference numerals represent like parts.

DETAILED DESCRIPTION OF THE INVENTION

Reference-Based Document Ranking System 11

Figure 1:
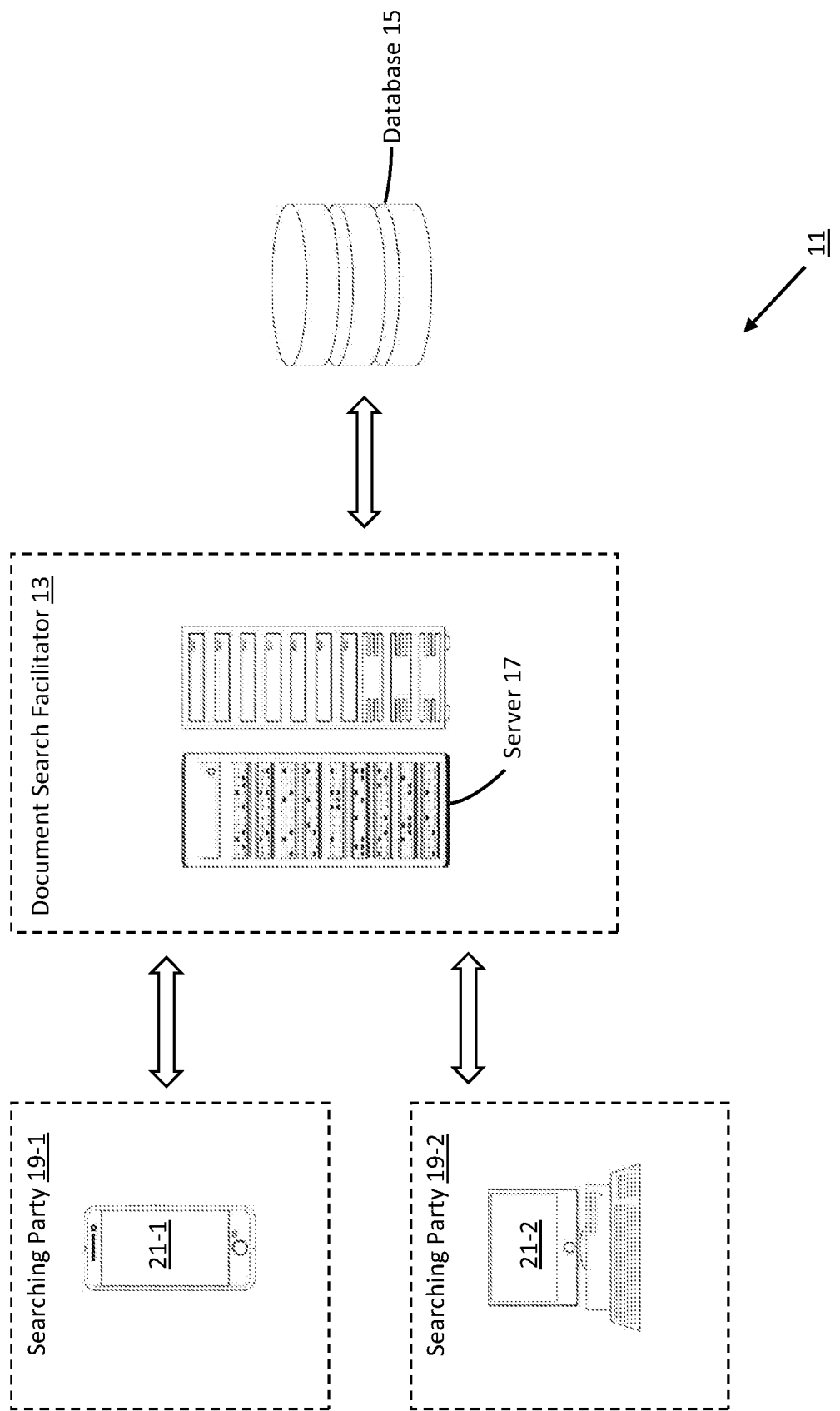
FIG. 1 is simplified schematic representation of a reference-based document ranking system constructed according to the teachings of the present invention.

Referring now to FIG. 1, there is shown a simplified schematic representation of a reference-based document ranking system which is constructed according to the teachings of the present invention, the system being defined generally by reference numeral 11. As will be explained in detail below, system 11 is implemented with a novel search algorithm which ranks documents based, at least in part, on reference frequency. As a principal feature of the present invention, system 11 is designed with two user-implementable search parameters which allow for the compensation, or adjustment, of results based upon the presence of (i) self-references or references based primarily on known interpersonal relationships, or (ii) subsets of documents which, although linked through references, are largely unrelated in subject matter. In this manner, the searching party is provided with the capability to derive an optimized set of search results.

It is to be understood that the present invention is particularly useful in addressing the effect of data deluge during the process of scientific discovery and related searching by enhancing the performance of search engines, which compile information in a wide spectrum of forms, from unstructured full-text to structured data. Therefore, it is envisioned that the applicability of the present invention could be extended beyond document searching to other, more general, discovery services (e.g. the identification of key opinion leaders).

As defined herein, the term "document" denotes any electronic record, or work, that may or may not reference other electronic records, either directly or indirectly. In the description that follows, documents are represented as articles, such as scientific publications, since articles are electronically-accessible works that traditionally cite other articles of related content, such as datasets. However, it is to be understood that use of the term "document" herein is not intended to be limited to scientific publications or other similar types of articles. Rather, use of the term "document" is meant to encompass any/all forms of electronic records (e.g. arbitrary, text-based, information records) derived from any source, including literature, online news stories, and even database records, without departing from the spirit of the present invention.

As defined herein, the term "reference" denotes any mention to another electronic work. In the description that follows, "reference" to other electronic works is represented interchangeably herein as citations. However, it is to be understood that use of the term "reference" is not limited to citations, but rather, may encompass other means of referring to alternative works, such as reference links.

As can be seen, document ranking system 11 comprises a document search facilitator 13 with access to at least one electronic document database 15. As can be appreciated, database 15 preferably includes a large collection of electronic documents, such as scientific articles, which are locally or remotely stored.

Document search facilitator 13 is represented herein as a central controller, or server, 17 in electronic communication with database 15. As will be explained further in detail below, server 17 is preferably programmed with a novel search algorithm which allows for the ranking of documents within database 15 based, at least in part, on citation frequency derived from a citation graph.

System 11 additionally comprises a plurality of searching parties 19-1 and 19-2 with the ability to interface with server 17 and thereby access the novel document search and rank methodology. As defined herein, searching party 19 represents any entity that desires access to an optimized selection of documents from database 15 (e.g., a researcher interested in access to pertinent scientific papers), with a single pair of searching parties 19 being shown in FIG. 1 for simplicity purposes and ease of illustration.

Documents from database 15 are accessed by each searching party 19 using a compute device 21. As defined herein, compute device 21 represents any type of device that is adapted to electronically retrieve an electronic document from database 15 via server 17. For instance, compute device 21-1 is represented herein as smartphone, whereas compute device 21-2 is represented herein as a desktop computer. However, it is to be understood that alternative types of compute devices which are known in the art, such as tablet or laptop computers, could be utilized in addition to or in place thereof without departing from the spirit of the present invention.

Graphical Model 111

Figure 2:
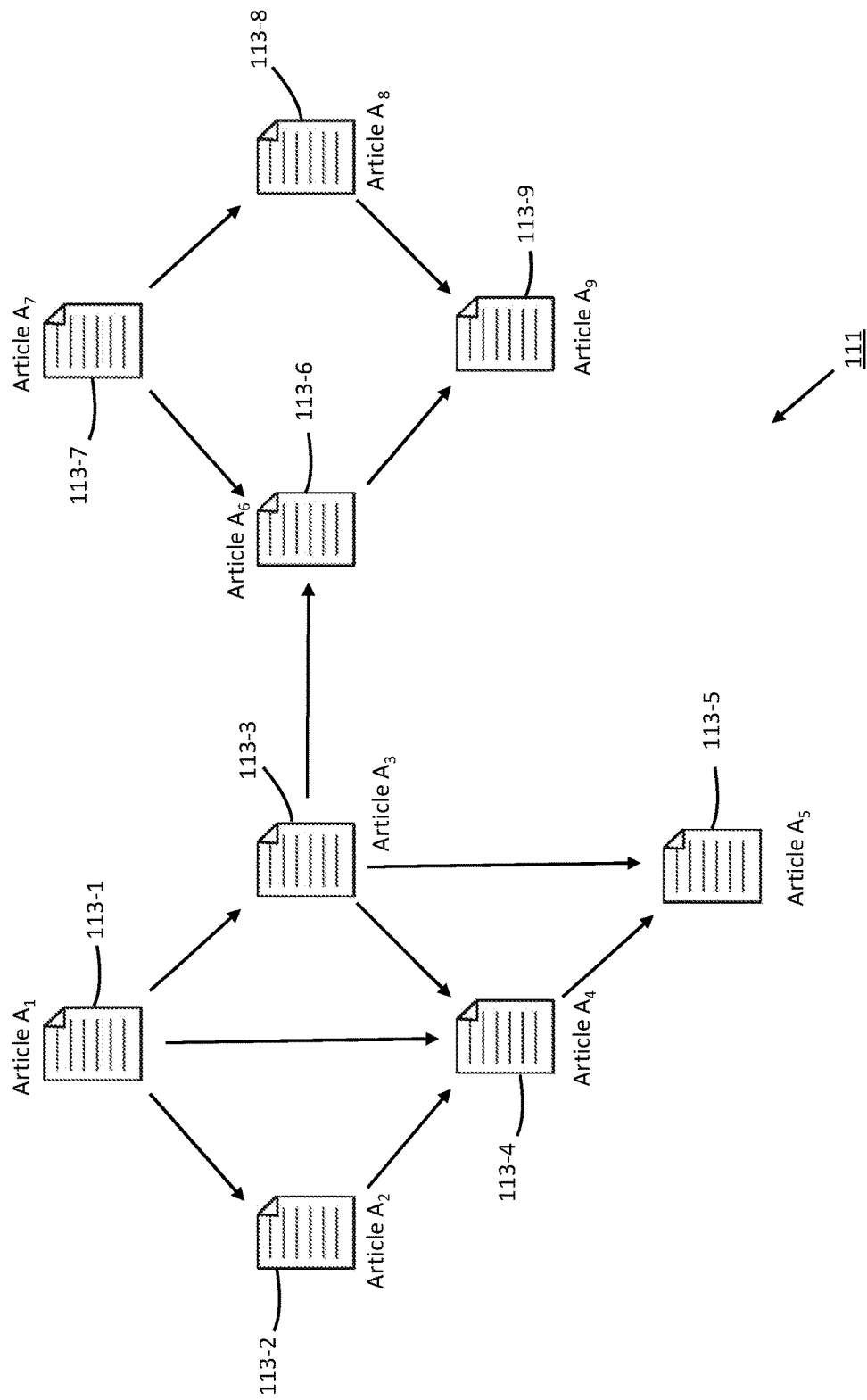
FIG. 2 is an illustrative graphical model of documents stored in the database shown in FIG. 1, the illustrative graphical model being provided to facilitate explanation of certain novel features of the present invention.

In FIG. 2, there is shown an illustrative graphical model which is useful in understanding the principles of the present invention, the graphical model being represented generally by reference numeral 111. As will be explained further in detail below, electronic graphical model, or graph, 111 depicts a collection of stored electronic articles $A_1$ thru $A_9$, also referred to herein interchangeably as articles 113-1 thru 113-9, in terms of relative citation. In this capacity, a conditional dependence structure between articles 113-1 thru 113-9 can be utilized for modelling the importance of each article. As a result, a document search can be implemented using a search algorithm (e.g. stored on server 17) in order to rank articles 113 in view of graph model 111, thereby affording a higher rank, or value, to articles 113 which are more frequently cited, either directly or indirectly.

More specifically, in illustrative graph model 111, (i) article 113-1 directly cites each of articles 113-2, 113-3 and 113-4, (ii) article 113-2 directly cites article 113-4, (iii) article 113-3 directly cites each of articles 113-4, 113-5 and 113-6, (iii) article 113-4 directly cites article 113-5, (iv) article 113-6 directly cites article 113-9, (v) article 113-7 directly cites each of articles 113-6 and 113-8, and (vi) article 113-8 directly cites article 113-9.

As can be appreciated, the particular number of articles shown in graph model 111, as well as the citation-based relationship defined therebetween, is provided for illustrative purposes only. Accordingly, graph model 111 is not limited to the particular arrangement of articles 113 represented herein, but rather, could be modified based on the nature of documents stored within database 15.

Additionally, as referenced previously, although graph model 111 depicts a collection of stored electronic articles 113, it is to be understood that the principles of the present invention are not limited to articles. Rather, articles 113 are shown herein for ease of understanding and alternative forms of documents and/or information records could be utilized in place thereof without departing from the spirit of the present invention.

As will be explained further in detail below, articles 113-1 thru 113-5 together form a first document cluster, or sub-graph, and articles 113-6 thru 113-9 form a second document cluster, or sub-graph. As can be appreciated, the identification of sub-graphs allows for smaller groups of articles 113 to be applied with the document ranking methodology of the present invention. In this manner, documents within a particular sub-graph can be ranked in terms of relative importance within their cluster, without being otherwise diluted by highly significant articles that fall outside of the subject matter of the document search, as well as in terms of global importance.

Using graph model 111, a substochastic matrix can be created which, in turn, can be used by server 17 to determine the probability that a particular article 113 is more or less important to a searching party 19 based on, inter alia, its direct or indirect citation by other articles. In other words, due to the various citation-based paths which are established between documents, the probability that an article 113 will be important to a searching party 19 due to its citational relevance can be calculated using an algorithm that makes use of a substochastic matrix derived from graphical model 111. For example, the probability that article 113-5 is an important article is relatively high, since numerous origination points (namely, each of articles 113-1 thru 113-4) all establish a citation path (i.e. a citation-based relationship) that ultimately leads to article 113-5.

Method of Document Ranking 211

Figure 3:
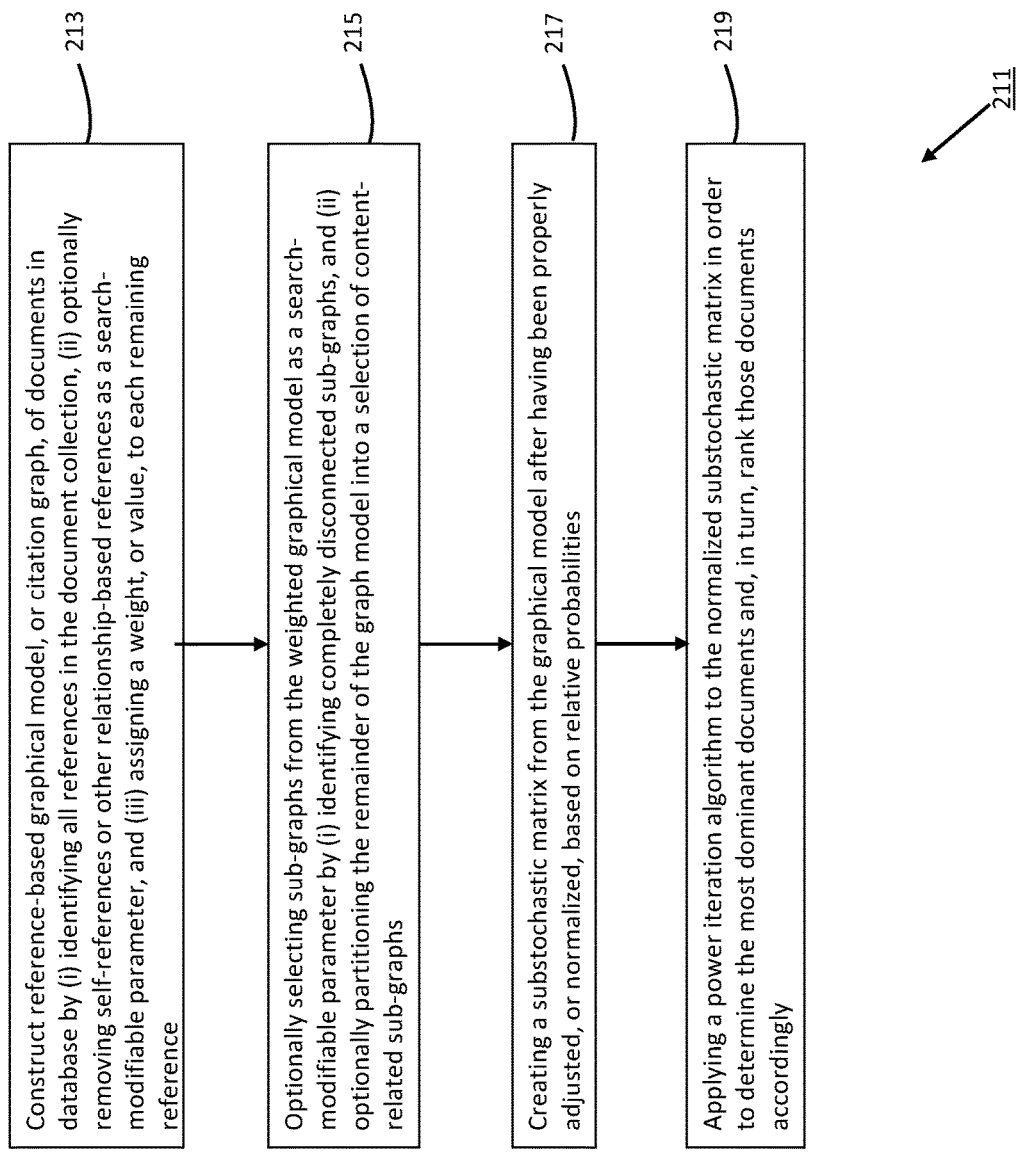
FIG. 3 is a flow chart representing a novel method of searching and ranking documents based, at least in part, on reference frequency, with implementation of the method being described using the architecture of the reference-based document ranking system shown in FIG. 1.

Referring now to FIG. 3, there is shown a novel method of searching and ranking documents based, at least in part, on reference frequency, the document ranking method being identified generally by reference numeral 211. As will be described further below, method 211 affords a searching party 19 with the ability to incorporate certain previously unavailable parameters in a reference-based document search including, but not limited to, (i) whether to devalue self-references and (ii) whether to restrict a search to a subset of cross-referenced documents. By providing a searching party 19 with the ability to assess the positive or negative effects of the aforementioned search parameters, the identification of an optimized collection of documents can be achieved in a simple and highly efficient fashion.

As the first step in document ranking method 211, an electronic, reference-based graphical model of documents stored in database 15 is constructed for access by server 17, this graphical model constructing step being identified generally by reference numeral 213. As a result, a conditional dependence between stored documents is established.

The creation of a reference graph (e.g. a citation graph) in step 213 is preferably accomplished by (i) identifying all references in each article 113, and (ii) assigning a weight, or value, to each reference based, at least in part, on the degree of self-reference and article similarity.

As previously referenced, self-references or other similar types of references (e.g. citations) based on preexisting relationships and/or affiliations are common practice in the industry and can negatively affect the results of document rankings. Therefore, these types of references, which are referenced herein simply as relationship-based references for ease of identification, are scrutinized as part of the present invention.

The identification of relationship-based citations can be accomplished, for example, by identifying and examining any unique identifiers assigned to an author or organization associated with any pair of documents related through reference. For instance, an ORCID identification number is a unique alphanumeric code issued to academic authors and contributors by ORCID, Inc. of Bethesda, Md. By accessing ORCID identification numbers, an author can be readily connected to known contributions and affiliations. As a result, relationship-based citations can be detected.

However, it is to be understood that self-references do not definitively compromise the quality of a document search, as an author may expand upon a theory or principle introduced in a previous article. Accordingly, the present invention preferably enables the searching party to evaluate search results based on the influence of self-references, which are weighted accordingly. In this manner, the searching party can effectively determine whether the presence of self-references has positive or negative effects on the search results and thereby select the more appropriate search results in view thereof.

Figure 4:
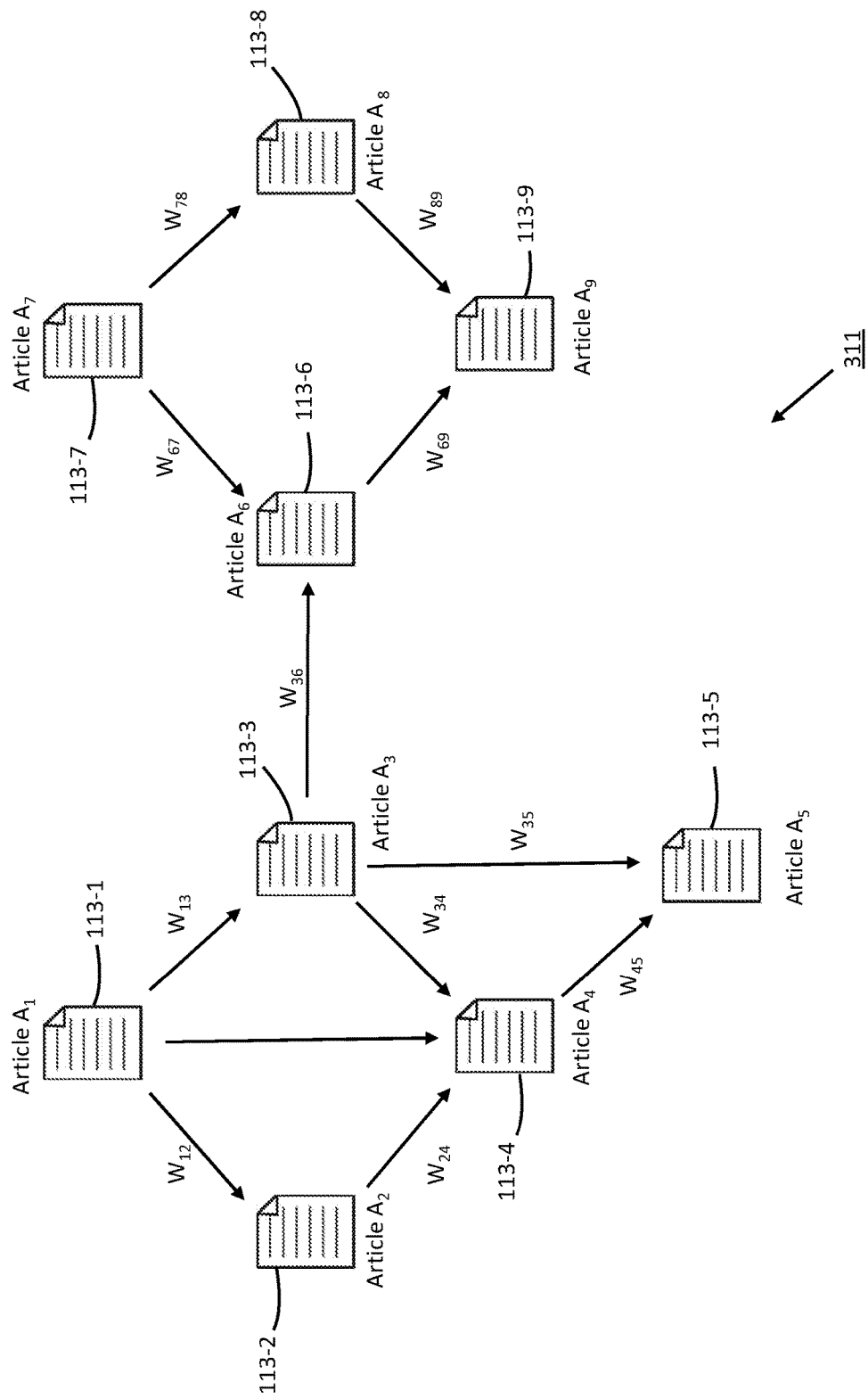
FIG. 4 is a reference-weighted version of the illustrative graphical model shown in FIG. 2 that is useful in explaining an optional search parameter which can be applied to the reference-based document ranking method of the present invention.

As referenced above, a reference weight, or value, is assigned to each citation vector in graphical model 111 in order to yield a weighted graphical model 311, as shown in FIG. 4. As can be appreciated, the designation of a weight, or value, for each reference serves to (i) increase the significance of a reference based on article relevance and (ii) decrease the significance of a reference based on interpersonal relationships or other potentially meritless factors. As a result, the document ranking process performed by server 17 ensures that the most significant documents are ranked accordingly in the search results, which is a principal object of the present invention.

Preferably, the reference weight $W_{ij}$ assigned to each citation vector in weighted graphical model 311 is calculated using the following equation:

$$W_{ij}=\alpha*((1/(1+\exp(-\beta*n_{ij})))+\exp(-d_{ij})),$$

where $\alpha$ and $\beta$ represent two constants of the model (e.g. $\alpha=0.95$ and $\beta=1.75$), $n_{ij}$ represents the degree of self-reference (i.e. $n_{ij}=0$ when an author cites their own article), and $-d_{ij}$ represents the distance, or inverse similarity (i.e. inverse strength of relation), between an article, $a_i$, and a second article, $a_j$, which is directly referenced by the first article, $a_i$. As such, if the reference of an article is deemed as highly relevant, or strong, the distance value is assigned a relatively small value (e.g. approaching 0), thereby yielding a reference contribution to the weight $W_{ij}$ that approaches 1. By contrast, if the reference to an article is deemed as being of limited relevance, or weak, the distance value is assigned a relatively large value (e.g. greater than 1), thereby yielding a reference contribution to the weight $W_{ij}$ that approaches 0.

It should be noted that the process for determining citation distance, $-d_{ij}$, can be accomplished using a variety of different techniques. The particular technique selected to determine reference distance is largely dependent upon (i) the extent of the access to the content within the related articles, as often only the title and/or selected metadata is available for examination, and (ii) the way that distance is measured for documents that originate from different sources (e.g., an article as compared to a dataset record). Accordingly, as one possible technique, reference distance $-d_{ij}$ may be calculated through a comparison, or matching, of keywords using available content, wherein higher keyword matching between articles denotes greater similarity and, as such, a lower distance value (e.g. approaching 0).

However, it should be noted that the present invention is not limited to the specific reference weight equation set forth above. Rather, it is to be understood that alternative value-based formulas could be utilized in place thereof without departing from the spirit of the present invention.

Upon completion of construction of weighted graphical model 311 in step 213, process 211 continues by identifying document clusters, or sub-graphs, from weighted model 311 as part of a sub-graph identification step 215. As will be explained further in detail below, the identification of document clusters as a search-modifiable parameter enables smaller groups of articles to be applied with the document ranking methodology of the present invention without being otherwise diluted by heavily referenced articles which may fall outside of the subject matter of the document search.

Sub-graph identification step 215 is preferably accomplished through a two-part process: (i) any completely disconnected clusters are recognized as sub-graphs and are identified as such, and (ii) remaining "master" clusters are evaluated and further partitioned into sub-groups based on the relative density of cross-references within each group.

Figure 5:
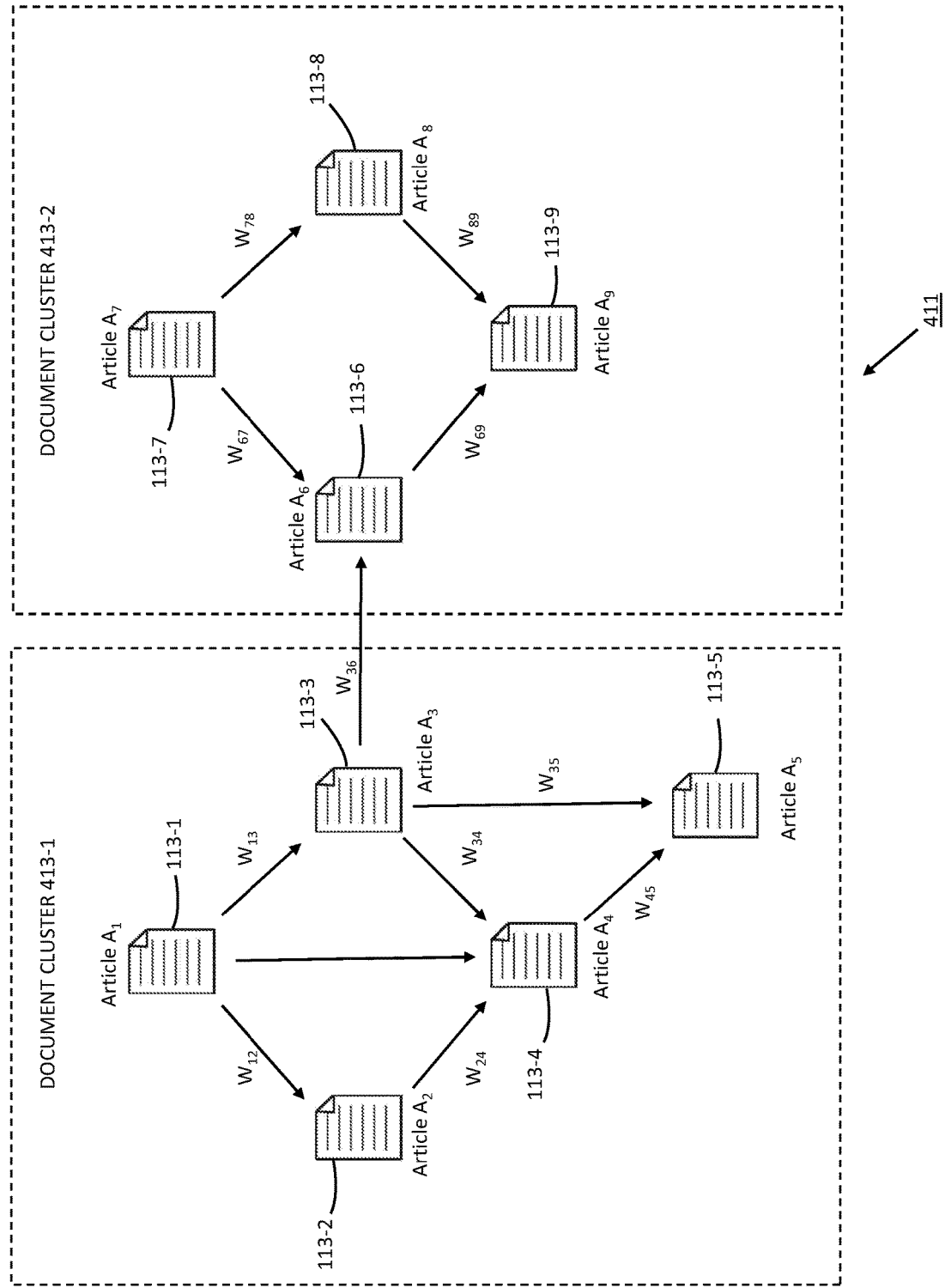
FIG. 5 is a partitioned version of the reference-weighted graphical model shown in FIG. 4 that is useful in explaining an optional search parameter which can be applied to the reference-based document ranking method of the present invention.

For instance, in FIG. 5, a pair of document clusters, or sub-graphs, 413-1 and 413-2 are detected in the weighted graphical model 311 constructed in step 213, the resultant partitioned model being represented herein generally by reference numeral 411. As can be seen, articles 113-1 thru 113-5 together form a first document cluster, or sub-graph, 413-1 and articles 113-6 thru 113-9 form a second document cluster, or sub-graph, 413-2. As previously noted, the establishment of sub-graphs 413 allows for smaller groups of articles to be applied with the document ranking methodology of the present invention. In this manner, documents within a particular sub-graph 413 can be ranked in terms of importance without being otherwise diluted by heavily-cited articles that may fall outside of the subject matter of the document search.

As one possible implementation for identifying sub-graphs within a larger "master" cluster, a sub-graph is determined if the number of references, or connections, between potential sub-graphs relative to the total number of reference vectors within either sub-graph, exceeds a defined threshold. If the resultant calculation falls beneath the designated threshold, the weight value for the inter-cluster reference, $W_{ij}$, is assigned a value of 0. Therefore, by designating a zero value to the reference weight, the sub-graphs, or clusters, are effectively disconnected within the graphical model.

For instance, in the present example shown in FIG. 5, if the number of reference connections between identified clusters 413-1 and 413-2 (i.e., one reference, $W_{36}$) relative to the total number of reference vectors, or edges, within either of the identified clusters 413-1 and 413-2 (i.e. seven reference vectors for cluster 413-1 and four reference vectors for cluster 413-2) falls beneath a predefined threshold (e.g., 0.2), the clusters 413 are determined to be sparsely related. As a consequence, the weight of the reference vector between the clusters 413-1 and 413-2 (i.e., $W_{36}$) is assigned a zero value in order to effectively disconnect the sub-graphs prior to the application of all document ranking algorithms.

This enables sub-graphs 413-1 and 413-2 to be individually evaluated by server 17 during subsequent document ranking processes, thereby potentially yielding more pertinent search results. As previously referenced, the identification of document clusters as a search-modifiable parameter enables smaller groups of articles (e.g. cluster 413-2) to be applied with the document ranking methodology of the present invention without being otherwise diluted by heavily-referenced articles (e.g. article 113-4) which may fall outside of the subject matter of the document search. For instance, if articles 113-6 thru 113-9 in document cluster 413-2 all relate to a specific scientific field of study, a heavily-referenced article in document cluster 413-1 (e.g. article 113-4), which may be largely unrelated to the designated field of study, should receive a lower ranking as a result.

Referring back to FIG. 3, upon completion of sub-graph partitioning step 215, the resultant graphical model 411 is utilized to construct a substochastic matrix as part of step 217. The weighted adjacency matrix (defined by $W_{ij}$) is first adjusted, as needed, to ensure that the relative reference weights are all properly normalized. In other words, the matrix is evaluated and adjusted, row-by-row, so that the sum of the probabilities associated with each possible vector path to a particular article 113 always equals 1. This normalization ensures that the power method will converge, and that the ranking of articles 113 will be unique.

As part of the establishment of sub-graphs in step 215, a reference weight between identified sub-graphs that falls beneath a designated value can be optionally assigned a zero value. This, in turn, allows the adjusted substochastic matrix for the master graph, constructed as part of step 217, to be separated into a plurality of sparse matrices, with one matrix constructed for each sub-graph 413. In this manner, an optimized search can be optionally focused onto a designated cluster 413 of documents or can rely on a weighted average that can be obtained from the contributions of each sub-graph.

By constructing an adjusted substochastic matrix for partitioned graphical model 411, a power iteration, or power method, can then be applied thereto by server 17 in order to determine the unique ranking of documents from the matrix, this power method application step being identified generally by reference numeral 219. In this capacity, the relative significance of documents can be determined and thereby ranked accordingly.

To summarize, the present invention provides a reference-based document ranking system that compensates for, or deemphasizes, references rendered based on preexisting relationships rather than content relevance and/or author recognizability. Accordingly, by providing the capability to alleviate, if not eliminate, any relationship bias associated with certain references and account for the importance of a document (e.g. an article) based on its "unbiased" references at the document-level (e.g. direct citation of specific articles), the document ranking system of the present invention more effectively discovers and presents the most optimal collection of documents to the searching party.

Furthermore, the present invention provides a reference-based document ranking system that accounts for subject matter, or content, variances between a vast collection of documents which are otherwise linked by references. Accordingly, by identifying and potentially partitioning a vast collection of documents linked by references into a selection of sub-collections, each of which is more closely related in content, the document ranking system of the present invention is more effectively able to discover and present the most optimal collection of documents to the searching party.

The invention described in detail above is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A method for ranking electronic documents, each electronic document having one or more authors, the method comprising the steps of:
   (a) constructing a reference-based graphical model of the electronic documents that identifies all references between the electronic documents;
   (b) assigning a weight to each reference in the electronic documents to yield a weighted graphical model, wherein the weight assigned to each reference is based on the relationship between the electronic documents, with each relationship-based reference being assigned a corresponding weight that decreases the significance of the reference;
   (c) creating a probability matrix based on the weighted graphical model; and
   (d) applying a power iteration to the probability matrix to yield a reference-based ranking of the electronic documents.

2. The method of claim 1 wherein, as part of the graphical model construction step, relationship-based references are removed from the reference-based graphical model.

3. The method of claim 2 wherein, as part of the graphical model construction step, relationship-based references exceeding a defined level are removed from the reference-based graphical model.

4. The method of claim 3 wherein relationship-based references include self-references, wherein a self-reference is a reference between electronic documents which share at least one common author.

5. The method of claim 4 wherein relationship-based references are identified by comparing unique identifiers associated with the electronic documents.

6. The method of claim 5 wherein relationship-based references are identified by comparing unique identifiers assigned to an author associated with each electronic document.

7. The method of claim 5 wherein relationship-based references are identified by comparing unique identifiers assigned to an organization associated with each electronic document.

8. The method of claim 1 wherein, as part of the weight assignment step, the weight assigned to each reference in the electronic documents is calculated through a comparison of selected keywords.

9. The method of claim 1 further comprising the step of, prior to the probability matrix creation step, identifying sub-graphs from the weighted graphical model.

10. The method of claim 9 wherein a probability matrix is constructed for each sub-graph identified within the weighted graphical model.

11. The method of claim 10 wherein, as part of the sub-graph identification step, disconnected clusters of documents are identified as sub-graphs.

12. The method of claim 11 wherein, as part of the sub-graph identification step, groups of documents are partitioned into sub-groups based on the number of cross-references within each group.

13. The method of claim 12 wherein the probability matrix creation step is applied to each sub-graph of the weighted graphical model when a number of references between sub-graphs relative to a total number of references within each sub-graph falls beneath a designated threshold.

14. The method of claim 13 wherein the probability matrix is a substochastic matrix.

* * * * *